US011968450B2

(12) United States Patent
Liao

(10) Patent No.: US 11,968,450 B2
(45) Date of Patent: Apr. 23, 2024

(54) METHOD AND APPARATUS FOR CONTROLLING HANDHELD GIMBAL, AND HANDHELD GIMBAL

(71) Applicant: GUILIN ZHISHEN INFORMATION TECHNOLOGY CO., LTD., Guilin (CN)

(72) Inventor: Yilun Liao, Guangxi (CN)

(73) Assignee: GUILIN ZHISHEN INFORMATION TECHNOLOGY CO., LTD., Guilin (CN)

( * ) Notice: Subject to any disclaimer, the term of this patent is extended or adjusted under 35 U.S.C. 154(b) by 853 days.

(21) Appl. No.: 16/968,587

(22) PCT Filed: May 14, 2018

(86) PCT No.: PCT/CN2018/086674
§ 371 (c)(1),
(2) Date: Aug. 8, 2020

(87) PCT Pub. No.: WO2019/153565
PCT Pub. Date: Aug. 15, 2019

(65) Prior Publication Data
US 2021/0051259 A1 Feb. 18, 2021

(30) Foreign Application Priority Data
Feb. 9, 2018 (CN) .......................... 201810133873.8

(51) Int. Cl.
F16M 11/12 (2006.01)
F16M 11/18 (2006.01)
(Continued)

(52) U.S. Cl.
CPC ......... H04N 23/685 (2023.01); F16M 11/123 (2013.01); F16M 11/18 (2013.01);
(Continued)

(58) Field of Classification Search
CPC ................................................. G03B 17/561
(Continued)

(56) References Cited

U.S. PATENT DOCUMENTS 9,851,046 B2 * 12/2017 Pan ........................ F16M 11/18
9,874,308 B2 * 1/2018 Saika ..................... F16M 13/02
(Continued)

FOREIGN PATENT DOCUMENTS

CN     102662404 A     9/2012
CN     102662404 A     9/2012
(Continued)

OTHER PUBLICATIONS

International Search Report for PCT/CN2018/085554 dated Nov. 2, 2018.
(Continued)

Primary Examiner — Leon W Rhodes, Jr.
(74) Attorney, Agent, or Firm — Rimon PC; Zhun Lu

(57) ABSTRACT

Provided are a method and apparatus for controlling a handheld gimbal, and a handheld gimbal. The method comprises: receiving an indication, input by a user, of entering a fast following mode; based on the indication of entering the fast following mode, updating control parameters of a camera component in one or more directions, wherein the control parameters of a camera component in one or more directions comprise the maximum following rate and acceleration of the camera component in one or more directions; and applying the updated control parameters of a camera component in one or more directions to control the rotation of one or more corresponding electric motors in a handheld gimbal, thus controlling the movement of the camera component in one or more directions. Where a gimbal handle needs to be rotated quickly for photography, the present invention can enable a camera component fixed (Continued)

on a handheld gimbal to quickly follow a target and perform photography smoothly.

9 Claims, 3 Drawing Sheets

(51) Int. Cl.
    *F16M 13/04*     (2006.01)
    *G03B 17/56*     (2021.01)
    *H04N 23/68*     (2023.01)
    *H04N 23/695*     (2023.01)

(52) U.S. Cl.
    CPC ........... *F16M 13/04* (2013.01); *G03B 17/563* (2013.01); *H04N 23/695* (2023.01)

(58) Field of Classification Search
    USPC ...................................... 348/208.3
    See application file for complete search history.

(56) References Cited

U.S. PATENT DOCUMENTS

| | | | |
|---|---|---|---|
| 10,394,107 | B2 | 8/2019 | Wang et al. |
| 11,028,967 | B2 * | 6/2021 | Su .................... G03B 17/563 |
| 2015/0365572 | A1 | 12/2015 | Fan |

FOREIGN PATENT DOCUMENTS

| | | |
|---|---|---|
| CN | 103268124 A | 8/2013 |
| CN | 105491293 A | 4/2016 |
| CN | 105759853 A | 7/2016 |
| CN | 205921657 U | 2/2017 |
| CN | 107079103 A | 8/2017 |
| CN | 107079103 A | 8/2017 |
| WO | 2016/000194 A1 | 1/2016 |
| WO | WO-2016000194 A1 | 1/2016 |

OTHER PUBLICATIONS

Search Report for Priority Application CN201810132674.5 dated Aug. 24, 2018.
Search Report for Priority Application CN201810133873.8 dated May 28, 2018.
Written Opinion of the International Searching Authority for PCT/CN2018/085554 dated Nov. 2, 2018.
International Preliminary Report on Patentability received for PCT Patent Application No. PCT/CN2018/086674, dated Aug. 20, 2020, 10 pages. (6 pages of English Translation and 4 pages of Original Document).
International Search Report and Written Opinion received for PCT Patent Application No. PCT/CN2018/086674 dated Oct. 28, 2018, 12 pages. (6 pages of English Translation and 6 pages of Original Document).
Decision to Grant a Patent for Japanese Patent Application No. 2020-540492, dated May 10, 2022 (3 pages).
Translation of Decision to Grant a Patent for Japanese Patent Application No. 2020-540492, dated May 10, 2022 (2 pages).

* cited by examiner

METHOD AND APPARATUS FOR CONTROLLING HANDHELD GIMBAL, AND HANDHELD GIMBAL

CROSS-REFERENCE TO RELATED APPLICATIONS

This application is a national stage application (under 35 U.S.C. § 371) of PCT/CN2018/086674, filed May 14, 2018, which claims benefit of Chinese Application No. 201810133873.8, filed Feb. 9, 2018, both of which are incorporated herein by reference in their entirety.

TECHNICAL FIELD

The present invention relates to the technical field of gimbals, and in particular to a method and apparatus for controlling a handheld gimbal to enter or exit a fast following mode.

BACKGROUND

Handheld gimbals, also known as handheld stabilizers, can be used to fix components with a photographing function (collectively referred to as camera components hereinafter) such as smartphones and cameras, and realize the smoothness and stability of photographing by controlling the movement/rotation of the camera components. At present, the mainstream handheld gimbals include single-axis handheld gimbals and multi-axis (e.g., dual-axis or three-axis) handheld gimbals. Each three-axis handheld gimbal has three axes (i.e., a roll axis, a pitch axis and a heading axis) and three corresponding electric motors. Each motor is configured to control the movement of the camera component in a corresponding direction. The three-axis handheld gimbal controls the movement of the camera component in three spatial directions by controlling the rotation of the three electric motors, respectively, so that a better photographing effect is achieved.

At present, the operating mode of the handheld gimbal usually includes a following mode (also called a common following mode) and a locking mode. The common following mode is usually classified into a heading following mode and a heading and pitch following mode (also called a completely following mode). In the common following mode, the camera component fixed on the handheld gimbal can move with the rotation of a handle, and can photograph video stably and smoothly. However, when a user encounters a situation where the handle needs to be quickly rotated for photographing, it is likely that the camera component cannot quickly follow a target in the common following mode, so that it is difficult to capture pictures of the target. The same is true in the locking mode. In a case where the target moves suddenly and quickly, the target may be lost if it is only switched to the common following mode.

SUMMARY

An objective of the present invention is to overcome the deficiencies in the prior art, so that a camera component can quickly follow the rotation of a handle without losing a target to be photographed. The objective of the present invention is realized by the following technical solutions.

In one aspect, provided is a method for controlling a handheld gimbal, including steps of:
step 1): receiving an indication to enter a fast following mode input by a user;
step 2): updating, based on the indication to enter the fast following mode, control parameters of a camera component in one or more directions, the control parameters of the camera component in the one or more directions comprising the maximum following rate and acceleration of the camera component in the one or more directions; and
step 3): controlling, by using the updated control parameters of the camera component in the one or more directions, the rotation of one or more corresponding electric motors in the handheld gimbal, so as to control the movement of the camera component in the one or more directions.

In the method, the updating control parameters of a camera component in one or more directions includes: increasing the maximum following rate of the camera component in each of the one or more directions, and increasing the acceleration of the camera component in each of the one or more directions.

In the method, the updated acceleration of the camera component in each of the one or more directions may change with the angle of rotation of the corresponding electric motor.

In the method, the control parameters of the camera component in one or more directions further include a control dead zone in the one or more directions; and, the updating control parameters of a camera component in one or more directions may further include: decreasing the control dead zone in each of the one or more directions.

The method may further include: recording a previous operating mode of the handheld gimbal prior to updating the control parameters.

After the step 3), the method may further include: receiving an indication to exit the fast following mode input by the user; updating, based on the recorded previous operating mode, the control parameters of the camera component as control parameters corresponding to the previous operating mode; and, controlling, by using the updated control parameters, the rotation of electric motors in the handheld gimbal, so as to control the movement of the camera component.

In another aspect, provided is an apparatus for controlling a handheld gimbal, including:
a human-machine interaction unit configured to receive an indication to enter a fast following mode input by a user; and
a control unit configured to update, based on the indication to enter the fast following mode, control parameters of a camera component in one or more directions, and control, by using the updated control parameters of the camera component in the one or more directions, the rotation of one or more corresponding electric motors in the handheld gimbal, so as to control the movement of the camera component in the one or more directions; wherein the control parameters of the camera component in the one or more directions include the maximum following rate and acceleration of the camera component in the one or more directions.

In the apparatus, the control unit may be further configured to record a previous operating mode of the handheld gimbal prior to updating the control parameters.

In the apparatus, the human-machine interaction unit may be further configured to receive an indication to exit the fast following mode input by the user. The control unit may be further configured to update, based on the recorded previous operating mode, the control parameters of the camera component as control parameters corresponding to the previous operating mode, and control, by using the updated control parameters, the rotation of electric motors in the handheld gimbal, so as to control the movement of the camera component.

In the apparatus, the human-interaction unit may be a button arranged on a handle of the handheld gimbal; wherein the user inputs the indication to enter the fast following mode by pressing down the button, and inputs the indication to exit the fast following mode by releasing the button.

The present invention has the following beneficial effects.

A fast following mode option is provided for a user of a handheld gimbal. In a case where a handle needs to be quickly rotated for photographing, the user can select the fast following mode so that a camera component fixed on the handheld gimbal can quickly follow a target and photograph smoothly, thereby avoiding losing the target in the photographed pictures.

BRIEF DESCRIPTION OF THE DRAWINGS

Exemplary embodiments will be described in detail with reference to the accompanying drawings, and the accompanying drawings are intended to describe the exemplary embodiments and shall not be interpreted as limitations to the intended scope of the claims. Unless otherwise expressly specified, the accompanying drawings shall not be regarded as being drawn to scale.

DETAILED DESCRIPTION OF THE PRESENT INVENTION

To make the objectives, technical solutions and advantages of the present invention clearer, the present invention will be further described below in detail by specific embodiments with reference to the accompanying drawings. It should be understood that the specific embodiments described herein are merely for explaining the present invention and not intended to limit the present invention.

It is to be noted that some exemplary methods are depicted as flowcharts. Although the flowcharts show that operations are executed sequentially, it should be understood that many operations may be executed concurrently, simultaneously or synchronously. In addition, the operations may be re-sorted. The process may be terminated when the operations are completed, or may have further steps that are not included in the accompanying drawings or embodiments.

Before the embodiments of the present invention are described, the control parameters of a camera component and the operating principle of a handheld gimbal will be described. By taking a three-axis handheld gimbal as an example, the camera component has a set of control parameters in each of three spatial movement directions, and the control parameters are used by a control unit in the handheld gimbal to control the movement of the camera component in each direction. For example, in a common following mode, the three-axis handheld gimbal controls, according to the control parameters of the camera component in a certain movement direction (referred to as direction hereinafter), the following rate and acceleration/deceleration of the camera component in this direction. To realize the common following mode, the control unit in the three-axis handheld gimbal generates, according to the control parameters of the camera component in three directions, the currents to be input to three electric motors, to control the rotation of the three electric motors. The movement of the camera component in the respective directions is controlled by controlling the rotation of the three electric motors. Due to the influence of the electric motors, the following rate of the camera component in each movement direction will not exceed a predetermined value (i.e., the maximum following rate in this direction). However, it is found through researches that the maximum following rate is still to be improved, which is of great significance to improve the following rate of the camera component.

Various embodiments of the present invention will be described below by taking a multi-axis handheld gimbal as an example.

Figure 1:
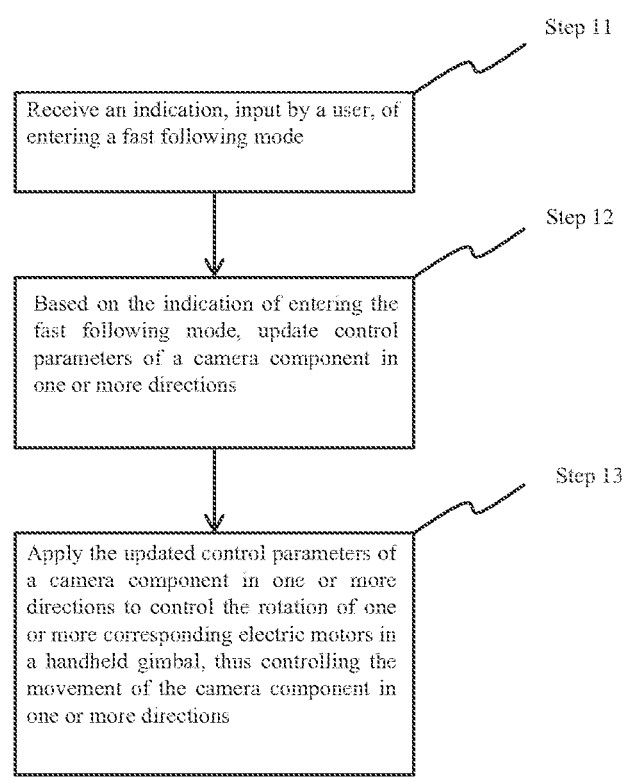
FIG. 1 is a flowchart of a method for controlling a handheld gimbal according to an embodiment of the present invention.

In accordance with an embodiment of the present invention, a method for controlling a handheld gimbal is provided. As shown in FIG. 1, the method includes steps of: step 11: receiving an indication to enter a fast following mode input by a user; step 12: updating, based on the indication to enter the fast following mode, control parameters of a camera component in one or more directions (i.e., in one or more movement directions of the camera component); and, step 13: controlling, by using the updated control parameters of the camera component in the one or more directions, the rotation of one or more corresponding electric motors in the handheld gimbal, so as to control the movement of the camera component in the one or more directions. Each of the steps will be described in detail below.

In the step 11, the user may input the indication to enter the fast following mode to the handheld gimbal by a human-machine interaction unit which for example is a button arranged on a handle. Then, the human-machine interaction unit transmits the indication to a control unit in the handheld gimbal. In the case of using a button-type human-machine interaction unit, the user may instruct to enter the fast following mode by pressing down the button. The advantage of inputting the user's indication by the button-type human-machine interaction unit is that since the user may suddenly encounter situations requiring accelerated following during the actual photographing process, the switchover between operating modes can be realized quickly and conveniently by using the button.

In the step 12, the control unit (e.g., CPU) in the handheld gimbal receives the indication to enter the fast following mode transmitted by the human-machine interaction unit, and then updates, according to the indication, the current control parameters of the camera component in one or more directions as control parameters corresponding to the fast following mode, so as to enter the fast following mode. It is to be noted that, due to the user's different requirements, it is possible to update the control parameters of the camera component in all movement directions, or it is also possible to update the control parameters of the camera component in only one direction.

For each of all movement directions, the control parameters of the camera component in that direction include the maximum following rate of the camera component in that direction (as described above, the maximum rate that the camera component can reach in that direction during its following rotation). In each direction, the maximum following rate of the camera component in the fast following mode is greater than that of the camera component in other operating modes. Thus, since the camera component can move at a higher maximum following rate in the fast following mode, the camera component can rotate more quickly, so that the camera component can follow the movement of the handle. It is to be noted that, the increase in the maximum following rate is influenced by the rotation speed of electric motors in the handheld gimbal. Due to the limited rotation speed of the electric motors, the increase in the maximum following rate is correspondingly limited. For example, in the prior art, the rotation speed limit at which the electric motor corresponding to the heading axis can operate normally is 200°/s, and the maximum following rate in the corresponding direction is generally set as 100°/s. Thus, in the common following mode, the following rate in this direction does not exceed 100°/s. In accordance with an embodiment of the present invention, in the fast following mode, by setting the maximum following rate in this direction to a value greater than 100°/s and less than 200°/s (e.g., 180°/s), the following rate of the camera component in this direction in the fast following mode can reach 180°/s. Similarly, in the prior art, the electric motors corresponding to the roll axis or the pitch axis are generally the same as the electric motor corresponding to the heading axis, that is, the rotation speed limit is 200°/s; and, the maximum following rate in the two directions is generally set as 80°/s. In accordance with other embodiments of the present invention, by setting the maximum following rate in the two directions in the fast following mode as 160°/s (or two different values, for example, 150°/s and 160°/s, respectively), the camera component can rotate more quickly in the two directions upon entering the fast following mode.

Although the electric motors having a rotation speed limit of 200°/s are used in the above embodiments, it should be understood by those skilled in the art that other types of electric motors are also available, for example, electric motors having a rotation speed limit of 180°/s, 220°/s or the like. For the electric motors having different rotation speed limits, the maximum following rate in the common following mode and the maximum following rate in the fast following mode may be set as different values according to the type of the motor. For example, for an electric motor having a rotation speed limit of 220°/s, in the common following mode, the maximum following rate in the corresponding direction may be set as 100°/s; while in the fast following mode, the maximum following rate in the corresponding direction may be set as 200°/s. In addition, in the above embodiments, each axis of the handheld gimbal uses an electric motor of the same type. In accordance with other embodiments of the present invention, each axis of the handheld gimbal may also use an electric motor of a different type.

In addition to the maximum following rate, the control parameters of the camera component may further include the acceleration of the camera component. For each of all the movement directions, the acceleration of the camera component in that direction is used to control the speed at which the camera component reaches the maximum following rate (or a target rate, e.g., the rotation speed of the handle) in that direction. In the fast following mode, the acceleration of the camera component in each direction may be greater than that in other operating modes, where the acceleration may be a static numerical value. In this way, after the control parameters are updated, the acceleration/deceleration of rotation of the camera component in each direction will be larger, so that the time required for reaching the maximum following rate or the target rate is shortened. It is to be noted that, since the acceleration at which the electric motor can operate normally is limited, the increase in acceleration is also limited. For example, the acceleration limit at which the electric motor corresponding to the heading axis of the handheld gimbal can operate normally is $100°/s^2$. In the prior art, the acceleration of the camera component in the common following mode is generally set as $40°/s^2$. In accordance with an embodiment of the present invention, the acceleration of the camera component in the fast following mode is set as a value greater than $40°/s^2$ and less than $100°/s^2$ (e.g., $80°/s^2$). Thus, the camera component can reach the maximum following rate or target rate more quickly upon entering the fast following mode. Similarly, the acceleration limit at which the electric motor corresponding to the roll axis or the pitch axis can operate normally is also generally $100°/s^2$, and the acceleration in the common following mode is also set as $40°/s^2$. Therefore, in other embodiments, the acceleration in the two directions in the fast following mode may be set as $80°/s^2$ (or two different values, e.g., $70°/s^2$ and $90°/s^2$, respectively), thereby realizing fast acceleration/deceleration.

Although the electric motors having an acceleration limit of $100°/s^2$ are used in the above embodiments, other types of electric motors (e.g., electric motors having an acceleration limit of $120°/s^2$) may be used in other embodiments. The acceleration of the camera component in the common following mode and the acceleration of the camera component in the fast following mode may be set as different values according to the type of the electric motor. In addition, in the above embodiments, each axis of the handheld gimbal uses a motor of the same type (e.g., an electric motor having an acceleration limit of $100°/s^2$). In accordance with other embodiments of the present invention, each axis of the handheld gimbal may also use an electric motor of a different type. It should be understood that the control parameters of the camera component in each direction may be set in advance. For example, the control parameters may be obtained in advance by multiple times of debugging, and may be stored in the handheld gimbal.

In the step 13, after the maximum following rate and acceleration of the camera component in the one or more directions are updated (that is, the maximum following rate and acceleration of the camera component in the one or more directions are increased), the control unit in the handheld gimbal controls, based on the updated maximum following rate and acceleration of the camera component in the one or more directions, the current flowing into one or more corresponding electric motors (as described above, each of the electric motors is configured to control the movement of the camera component in the corresponding direction), so as to control the rotation of the one or more electric motors. By controlling the rotation of the one or more electric motors, the movement of the camera component in one or more corresponding directions is controlled.

Figure 3:
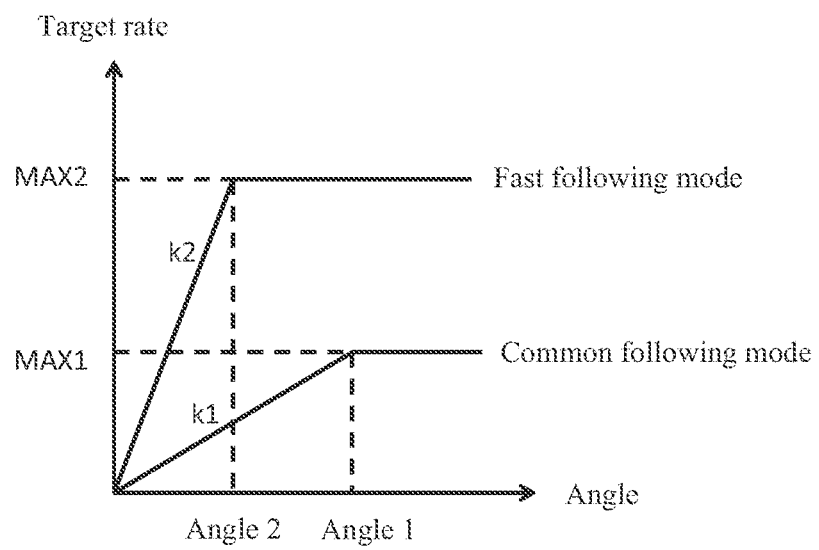
FIG. 3 shows the angle of rotation of a corresponding electric motor when a camera component reaches the maximum following rate in one direction in different operating modes.

FIG. 3 shows the angle of rotation of an electric motor configured to control the movement of the camera component in one direction when the camera component reaches the corresponding maximum following rate in this direction in both the common following mode and the fast following mode (where the maximum following rate and the acceleration are increased). In the common following mode, when the corresponding electric motor rotates by an angle 1, the camera component reaches the maximum following rate MAX1; and, in the fast following mode, when the corresponding electric motor rotates by an angle 2 (the angle 2<the angle 1), the camera component reaches the maximum following rate MAX2 (MAX2>MAX1). It can be known from FIG. 3 that the camera component can reaches a higher maximum following rate more quickly in the fast following mode.

Figure 4:
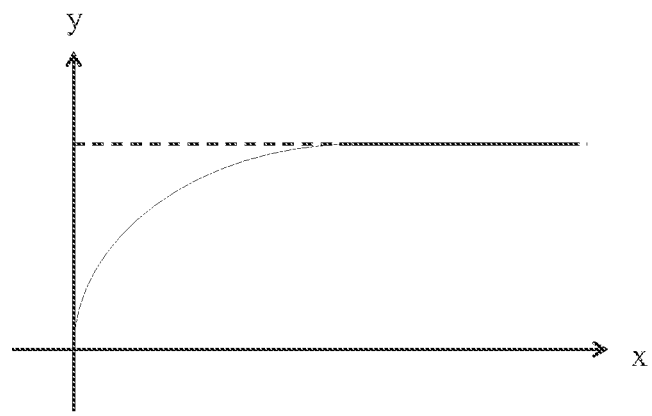
FIG. 4 shows a schematic view of the change in the following rate of the camera component in one direction.

The acceleration of the camera component shown in FIG. 3 is a static constant value. However, in another embodiment, upon receiving the indication to enter the fast following mode, the acceleration of the camera component in one or more directions may be updated as a variable value (e.g., which changes with the angle of rotation of the corresponding motor), so that the requirements of different users are satisfied. FIG. 4 is a graph showing change of following rate of the camera component in one direction. The following rate is expressed as:

$$y=ax^2+bx+c \qquad (1)$$

where y denotes the following rate of the camera component, x denotes the angle of rotation of the electric motor configured to control the movement of the camera component in this direction, and a, b and c are parameters which may be selected according to the user's actual needs. In addition, the acceleration of the camera component in this direction can be obtained by derivation of formula (1).

In a preferred embodiment, the control parameters may include a control dead zone. When it is detected that the movement of the handle of the handheld gimbal in a certain direction exceeds the control dead zone in this direction, the movement of the camera component in this direction is triggered, that is, the camera component starts to follow the handle. To better realize fast following, in the fast following mode, the control dead zone of the camera component in each direction may be less than the control dead zones corresponding to other operating modes. This is because the response of the handheld gimbal is more sensitive if the value of the control dead zone is smaller. For example, in the prior art, in the common following mode, the control dead zones in the directions corresponding to the roll axis and the heading axis are generally 5°, and the control dead zone in the direction corresponding to the pitch axis is generally 3°. In accordance with an embodiment of the present invention, in the fast following mode, the control dead zone of the camera component in each direction may be set as 1°.

Figure 2:
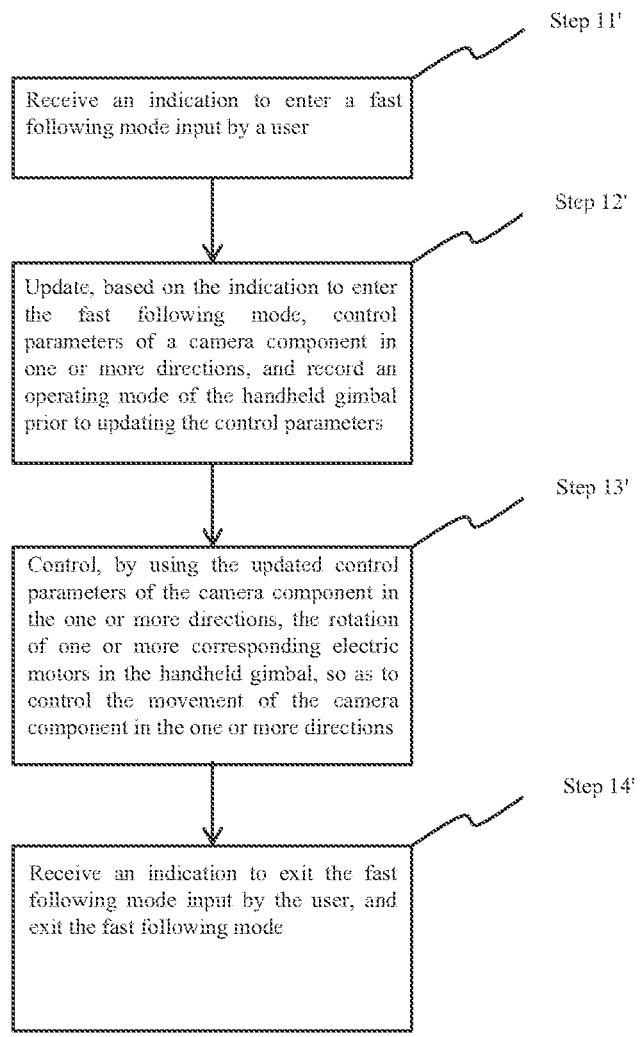
FIG. 2 is a flowchart of a method for controlling a handheld gimbal according to another embodiment of the present invention.

In accordance with another embodiment of the present invention, a method for controlling a handheld gimbal is further provided. FIG. 2 shows a flowchart of this method embodiment. This method includes steps of: step 11': receiving an indication to enter a fast following mode input by a user; step 12': updating, based on the indication to enter the fast following mode, control parameters of a camera component in one or more directions, and recording an operating mode of the handheld gimbal prior to updating the control parameters; step 13': controlling, by using the updated control parameters of the camera component in the one or more directions, the rotation of one or more corresponding electric motors in the handheld gimbal, so as to control the movement of the camera component in the one or more directions; and, step 14': receiving an indication to exit the fast following mode input by the user, and exiting the fast following mode. The steps 11'-13' describe the process of entering the fast following mode and are substantially the same as the steps 11-13 described above; but in the step 12', the control unit in the handheld gimbal needs to record the operating mode of the handheld gimbal prior to updating the control parameters. The step 14' will be described in detail below.

In the step 14', firstly, the indication to exit the fast following mode input by the user may be received by a human-machine interaction unit (e.g., a button). In the case of using a button-type human-machine interaction unit, the user may instruct to exit the fast following mode by releasing the button (as described above, the user instructs to enter the fast following mode by pressing down the button). Then, the human-machine interaction unit transmits the indication to the control unit; and the control unit searches the records on the operation mode of the handheld gimbal before entering the fast following mode, and updates the current control parameters as control parameters corresponding to the previous operating mode. Next, the control unit controls, by using the updated control parameters, the rotation of electric motors, so as to control the movement of the camera component in each direction.

In the embodiment shown in FIG. 2, when the user inputs the indication to exit the fast following mode via the human-machine interaction unit, the control unit updates, based on this indication, values of the control parameters, so that the handheld gimbal enters the previously recorded operating mode (i.e., the operating mode before entering the fast following mode). In another embodiment, it is possible to exit the fast following mode according to an indication to enter another operating mode (e.g., a locking mode or a common following mode) input by the user. Specifically, the user may input the indication to enter another operating mode by another human-machine interaction unit (i.e., a human-machine interaction unit different from the buttons for inputting the indication to enter and exit the fast following mode), and then the human-machine interaction unit transmits the indication to enter another operating mode to the control unit of the handheld gimbal. With regard to the indication to enter another operating mode, the control unit updates the current control parameters as control parameters corresponding to the another operating mode, and controls, by using the updated control parameters, the movement of the camera component in each direction.

Although the human-machine interaction unit configured to input the user's indication is described above in the form of a button, it should be understood that, in other embodiments, the human-machine interaction unit may also be a switch, an interactive screen or other components arranged on the handle of the gimbal. The components may be connected to the control unit in the handheld gimbal in a wireless or wired connection manner, so that it is convenient to transmit the user's indication to the control unit. In other embodiments, the user may also input the indication to enter the fast following mode by the camera component fixed on the handheld gimbal. For example, the user instructs the handheld gimbal to enter the fast following mode by setting an APP in a smartphone, and the smartphone may transit this indication to the control unit in the handheld gimbal in a wireless or wired connection manner. However, in a case where the user's indication is input by the camera component (or other external components), the user may be unable to quickly instruct the handheld gimbal to exit the fast following mode. To solve this problem, in an embodiment, the indication to exit the fast following mode may be input by another interactive unit arranged on the handheld gimbal.

The method may be implemented by hardware, software, firmware, middleware, pseudo-codes, hardware description languages or any combination thereof. When the method is implemented by software firmware, middleware or pseudo-codes, the program codes or code segments used for executing tasks may be stored in a computer readable medium (e.g., a storage medium), and the tasks may be executed by a processor.

It should be understood that the exemplary embodiment implemented by software are generally encoded on program storage mediums in some forms or implemented on some types of transmission mediums. The program storage mediums may be any non-temporary storage mediums, such as magnetic disks (e.g., floppy disks or hard disks) or optical disks (e.g., compact disc read-only memories (CD ROMs)), and may be read-only or random-access mediums. Similarly, the transmission mediums may be twisted-pair wires, coaxial cables, optical fiber, or some other suitable transmission mediums known in the art.

Although the present invention has been described by preferred embodiments, the present invention is not limited to the embodiments described herein. Various alterations and variations made without departing from the scope of the present invention shall be included.

The invention claimed is:

1. A method for controlling a handheld gimbal, comprising:
    step 1): receiving an indication to enter a fast following mode input by a user;
    step 2): updating, based on the indication to enter the fast following mode, control parameters of a camera component in one or more directions, the control parameters of the camera component in the one or more directions comprising the maximum following rate and acceleration of the camera component in the one or more directions; and
    step 3): controlling, by using the updated control parameters of the camera component in the one or more directions, the rotation of one or more corresponding electric motors in the handheld gimbal, so as to control the movement of the camera component in the one or more directions;
    wherein the updating control parameters of a camera component in one or more directions comprises: increasing the maximum following rate of the camera component in each of the one or more directions, and increasing the acceleration of the camera component in each of the one or more directions, and
    wherein the updated acceleration of the camera component in each of the one or more directions changes with the angle of rotation of the corresponding electric motor.

2. The method according to claim 1, wherein the control parameters of the camera component in one or more directions further comprise a control dead zone in the one or more directions; and, the updating control parameters of a camera component in one or more directions further comprises: decreasing the control dead zone in each of the one or more directions.

3. The method according to claim 1, further comprising: recording a previous operating mode of the handheld gimbal prior to updating the control parameters.

4. The method according to claim 3, after the step 3), further comprising:
    receiving an indication to exit the fast following mode input by the user;
    updating, based on the recorded previous operating mode, the control parameters of the camera component as control parameters corresponding to the previous operating mode; and controlling, by using the updated control parameters, the rotation of electric motors in the handheld gimbal, so as to control the movement of the camera component.

5. An apparatus for controlling a handheld gimbal, comprising:
    a human-machine interaction unit configured to receive an indication to enter a fast following mode input by a user; and
    a control unit configured to update, based on the indication to enter the fast following mode, control parameters of a camera component in one or more directions, and control, by using the updated control parameters of the camera component in the one or more directions, the rotation of one or more corresponding electric motors in the handheld gimbal, so as to control the movement of the camera component in the one or more directions;
    wherein the control parameters of the camera component in the one or more directions comprise the maximum following rate and acceleration of the camera component in the one or more directions;
    wherein the updating control parameters of a camera component in one or more directions comprises: increasing the maximum following rate of the camera component in each of the one or more directions, and increasing the acceleration of the camera component in each of the one or more directions, and
    wherein the updated acceleration of the camera component in each of the one or more directions changes with the angle of rotation of the corresponding electric motor.

6. The apparatus according to claim 5, wherein the control unit is further configured to record a previous operating mode of the handheld gimbal prior to updating the control parameters.

7. The apparatus according to claim 6, wherein the human-machine interaction unit is further configured to receive an indication to exit the fast following mode input by the user; and
    the control unit is further configured to update, based on the recorded previous operating mode, the control parameters of the camera component as control parameters corresponding to the previous operating mode, and control, by using the updated control parameters, the rotation of electric motors in the handheld gimbal, so as to control the movement of the camera component.

8. The apparatus according to claim 5, wherein the human-interaction unit is a button arranged on a handle of the handheld gimbal; and
    wherein the user inputs the indication to enter the fast following mode by pressing down the button, and inputs the indication to exit the fast following mode by releasing the button.

9. A handheld gimbal, comprising a processor, a memory, a handle and one or more electric motors, wherein the memory stores instructions that can be executed by the processor; and, the instructions, when executed by the processor, cause the handheld gimbal to implement the method according to claim 1.

* * * * *